United States Patent [19]

Jepsen

[11] 3,720,308

[45] March 13, 1973

[54] HEAVY LIQUID SEPARATION OF BRUCITE FROM ASSOCIATED MINERALS OF BRUCITIC ORES

[75] Inventor: Tage L. B. Jepsen, Gabbs, Nev.

[73] Assignee: Basic Incorporated, Cleveland, Ohio

[22] Filed: April 20, 1970

[21] Appl. No.: 30,266

[52] U.S. Cl. ................................. 209/11, 209/172
[51] Int. Cl. ........................... B03b 1/02, B03d 1/00
[58] Field of Search ............. 209/11, 172, 172.5, 173

[56] References Cited

UNITED STATES PATENTS

| | | | |
|---|---|---|---|
| 2,150,917 | 3/1939 | Foulke | 209/172 |
| 2,426,398 | 8/1947 | Lathrup | 209/173 |
| 2,688,401 | 9/1954 | Schmitkons | 209/172 |
| 2,771,993 | 11/1956 | Wendt | 209/172 |
| 3,478,875 | 11/1969 | Roberts | 209/11 X |
| 3,578,162 | 5/1971 | Jepsen | 209/172 |

FOREIGN PATENTS OR APPLICATIONS

| | | | |
|---|---|---|---|
| 643,971 | 3/1934 | Germany | 209/172 |

OTHER PUBLICATIONS

The Collier, Guardian, 8/3/1934, 199–201.

*Primary Examiner*—Frank W. Lutter
*Assistant Examiner*—Robert Halper
*Attorney*—McGrew and Edwards

[57] ABSTRACT

Brucite in finely divided condition is collected as a high grade concentrate of brucitic ores and other magnesium hydroxides by selective temperature control of heavy liquid media during continuous treatment. Ore is initially assayed to determine the specific gravity of its brucite content and methylene bromide as heavy liquid media will be used at its usual specific gravity of 2.48 at ambient temperature. If higher grade product is desired, changes in temperature of media are developed to obtain density drop to 2.40, for example. To change back to normal production media temperature is adjusted and no change in media composition is required.

4 Claims, No Drawings

HEAVY LIQUID SEPARATION OF BRUCITE FROM ASSOCIATED MINERALS OF BRUCITIC ORES

This invention relates to a heavy media separation of brucite and other natural or artificial magnesium hydroxides from associated solids matter.

Many minerals are conveniently separated and concentrated in heavy-liquid media and for many purposes a media composed of a single liquid organic compound of suitable specific gravity will be preferable over an aqueous suspension of finely-divided high-density solids. Usually the normal specific gravity of a single phase heavy liquid media does not coincide exactly with the optimum specific gravity for such a separation. Where the difference is substantial, it has been customary to blend two or more miscible heavy liquids to increase, or decrease, the normal specific gravity of the principal constituent; and because such a media is too costly to be wasted after a single pass treatment, it is separated from other associated material after such treatment and returned to a following stage of the treatment as the media of that separation. The blend of liquids requires time-consuming and costly procedures for the separation of the blended liquid into its initial constituents and consequently such blending procedures are not used commercially if other satisfactory procedures can be developed.

Brucite has been under investigation to develop better procedures for its separation from associated matter of its natural formation and such a separation in a heavy liquid media has been disclosed in my copending application Ser. No. 862,979, filed Oct. 1, 1969, now U.S. Pat. No. 3,578,162 for Beneficiation of Magnesian Ores or the Like. In the course of my investigations of the treatment procedures of that application, I discovered that temperature variations of the liquid media altered the settling rate of underflow material and could be utilized as an effective instrumentality in developing highly efficient and low cost separations, particularly with respect to brucite concentration.

Accordingly, it is an object of my invention to provide a simple, economical and efficient heavy liquid separation process in which temperature of the liquid media is selectively varied to control the grade of the concentrate material.

Another object of the invention is to regulate the temperature of heavy liquid media in such a treatment to increase the settling rate of underflow material and thereby provide a greater throughput capacity for the equipment being used in the treatment by shortening the settling time of the underflow material.

A further object of the invention is to provide a simple, economical and efficient procedure for treatment of brucite and other natural or artificial magnesium hydroxides including changing the density of the liquid media during treatment to vary the grade of the separated brucite.

Still another object of the invention is to provide a treatment of such materials in a heavy liquid media in which the temperature of such media is increased to cause a lowering of viscosity of the media.

Yet another object of the invention is to provide in such a treatment a lowering of the temperature of the media to increase density and viscosity thereof as a feature of controlling the grade of the product obtained in the treatment.

Still another object of the invention is to provide a temperature control of the liquid media used for separating the constituents according to specific gravity which provides substantial variation in the specific gravity of the liquid media and requires only temperature change to vary the specific gravity within the maximum temperature range.

In the practice of my invention, brucite ore or other magnesium hydroxides are subjected to size reduction to a suitable state of fineness, as, for example, a minus 35 plus 200 mesh product. Methylene bromide $CH_2Br_2$ has been found to be a very suitable heavy liquid reagent for such a treatment as the density of pure methylene bromide is 2.48 at 25° C. which provides a high recovery in relatively short treatment time and by altering the density to 2.40, a very high grade brucitic concentrate is obtained. As there is no dilution of the methylene bromide by reason of such temperature changes, a change in temperature is all that is required to restore the liquid to its initial density after a period of operation at such altered density. This is a great convenience in treating the liquid media for return to the treatment circuit, as the only separation required is a liquid-solids separation, as by screening, filtering or the like. Also because such temperature changes can be effected during operation without interference with the operation, the treatment can be performed at all times at relatively high efficiency, and because of its limited treatment time, a minimum of equipment is required for treatment at a given throughput rate.

After I had noted the effect of temperature changes in density control of the heavy liquid media, I undertook a series of tests to determine an effective temperature range and thereby an optimum specific gravity range. This testing established a settling velocity of the underflow gangue material related to selected temperatures for the media, and that temperature adjustment in a continuous operation is of great practical value. It is well known to all versed in the art of mineral processing that metallurgical results depend to a great extent on the composition of the feed as regards chemical analysis and particle size. In addition, the desired grade of concentrate changes considerably depending on the application for the product. For this reason, I not only believe it to be desirable to control the density but also impossible to operate a heavy liquid process efficiently without dependable temperature control.

In the aforementioned testing, the material taken for treatment was brucite in the size range of minus 35 plus 200 mesh. The same head sample was used on all three tests to make comparison simple. It is likely that the settling velocities would be different on another product of different screen sizes, but the ratio between the various velocities would presumably remain comparable. The test samples indicate that the MgO content of brucite concentrate increases by almost one-half of 1 percent by increasing the temperature by 10° C up to a maximum of ± 60° C. Beyond this point all brucite will sink so that no recovery is attained.

The results of said testing are as follows:

Test No. 1

Temperature of media = 60° C.
Specific Gravity of Media = 2.40
Settling Velocity of Sink = 1 meter in 3 minutes 15 seconds.

| Product | % Wt. | % $SiO_2$ | % $Fe_2O_3$ | % $Al_2O_3$ | % CaO | % MgO |
|---------|-------|-----------|-------------|-------------|-------|-------|
| Head | 100.00 | 4.35 | 1.44 | 0.86 | 3.95 | 89.40 |
| Sink | 84.85 | 4.95 | 1.45 | 2.27 | 4.57 | 86.76 |
| Float | 15.15 | 0.99 | 1.36 | 0.23 | 0.48 | 96.94 |

Chemical Analyses on an ignition free basis

Test No. 2

Temperature of Media = 40° C.
Specific Gravity of Media = 2.44
Settling Velocity of Sink = 1 meter in 4 minutes 10 seconds.

| Product | % Wt. | % $SiO_2$ | % $Fe_2O_3$ | % $Al_2O_3$ | % CaO | % MgO |
|---------|-------|-----------|-------------|-------------|-------|-------|
| Head | 100.00 | 4.35 | 1.44 | 0.86 | 3.95 | 89.40 |
| Sink | 33.33 | 10.33 | 1.62 | 1.65 | 10.44 | 75.96 |
| Float | 66.67 | 1.35 | 1.35 | 0.46 | 0.70 | 96.14 |

Chemical analyses on an ignition free basis

Test No. 3

Temperature of Media = 20° C.
Specific Gravity of Media = 2.48
Settling Velocity of Sink = 1 meter in 7 minutes 25 seconds

| Product | % Wt. | % $SiO_2$ | % $Fe_2O_3$ | % $Al_2O_3$ | % CaO | % MgO |
|---------|-------|-----------|-------------|-------------|-------|-------|
| Head | 100.00 | 4.35 | 1.44 | 0.86 | 3.95 | 89.40 |
| Sink | 16.97 | 16.10 | 1.78 | 2.45 | 17.63 | 62.04 |
| Float | 83.03 | 1.95 | 1.37 | 0.53 | 1.16 | 94.99 |

Chemical analyses on an ignition free basis

A preferred practice of my invention is to reduce brucite ore to a minus 35 plus 200 product as the feed material for treatment. The heavy liquid media of the treatment is methylene bromide maintained at a temperature establishing a density of 2.48. If a very high grade product is desired, the temperature is adjusted to maintain a density of 2.40. The treatment may be performed in any well known heavy media separator and the treatment circuit will include stages for separation, cleaning and recycling of the liquid media with only enough new media entered to replace the losses of a previous cycle.

The float product of the separation comprises high grade brucite substantially free from gangue contaminants, and if media is present in any significant quantity, it can be separated easily by screening and returned to the recycle charge. The high grade brucite discharge is the final product of the treatment and is handled as a concentrate material on discharge from the treatment.

In order to have a comparison table showing density and viscosity changes responsive to temperature change, I compiled the following while conducting tests using methylene dibromide for the media of the separation:

| Temperature °C | Density g./c.c. | Viscosity Centipoises |
|---|---|---|
| 20 | 2.50 | 1.05 |
| 25 | 2.48 | 0.98 |
| 40 | 2.44* | 0.87 |
| 50 | 2.42* | 0.83* |
| 60 | 2.40* | 0.78* |

* Extrapolated values

While the foregoing tabulation shows density values beyond 30° C. and viscosity values beyond 50° C. which were extrapolated, it is believed that such values are probably accurate at the second decimal point.

I claim:

1. The method of heavy liquid media treatment for the separation of brucite and other natural or artificial magnesium hydroxides from associated gangue matter which comprises feeding such material in finely divided condition into and through a confined body of methylene bromide as liquid media for the separation of brucite from other feed constituents of different specific gravity, including the step of changing the density of said liquid media during the treatment to vary the grade of the separated brucite without changing the composition of said liquid media, said change in density being effected by changing the temperature of the liquid media during the treatment to a temperature for establishing a predetermined density within the range of 2.40 and 2.48, and continuously controlling the temperature of the media to maintain said predetermined density.

2. The method of heavy liquid media treatment for the separation of brucite and other natural or artificial magnesium hydroxides from associated gangue matter which comprises feeding such material in finely divided condition into and through a confined body of methylene bromide as liquid media for the separation of brucite from other feed constituents of different specific gravity, including the step of raising the temperature of the heavy liquid media to a predetermined value for decreasing the density thereof and thereby increasing the settling rate of underflow material of the treatment, and continuously controlling the temperature of the heavy liquid for maintaining the lowered density thereof without changing the composition of the liquid media.

3. The method of heavy liquid media treatment for the separation of brucite and other natural or artificial magnesium hydroxides from associated gangue matter which comprises feeding such material in finely divided condition into and through a confined body of methylene bromide as liquid media for the separation of brucite as a float concentrate from other feed constituents of different specific gravity as underflow in a cyclic operation, separating said liquid media from the float and underflow products after discharge from the confined body, recycling said separated media through the confined body without changing the composition of the liquid during a period of continuous operation, and controlling the temperature of the recycle liquid media to change its density to a predetermined value in the next pass of the liquid thru said confined body.

4. The method of heavy liquid media treatment for the separation of brucite and other natural or artificial magnesium hydroxides from associated gangue matter which comprises feeding such material in finely divided condition into and through a confined body of methylene bromide as liquid media for the separation of brucite from feed constituents of different specific gravity, including the step of changing the density of said liquid media during the treatment by varying its temperature within the range of 25° and 60° C. and thereby varying the grade of the separated brucite without change in the composition of the liquid, and continuously controlling the temperature of said liquid media for maintaining the liquid at the selected temperature within said range during treatment to produce the selected grade of the separated brucite.

* * * * *